United States Patent
Chen

(10) Patent No.: US 9,521,051 B2
(45) Date of Patent: Dec. 13, 2016

(54) METHOD FOR HANDLING INVALID PACKET

(71) Applicants: INVENTEC (PUDONG) TECHNOLOGY CORPORATION, Shanghai (CN); INVENTEC CORPORATION, Taipei (TW)

(72) Inventor: Chia-Hsiang Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 120 days.

(21) Appl. No.: 14/677,724

(22) Filed: Apr. 2, 2015

(65) Prior Publication Data

US 2016/0154689 A1    Jun. 2, 2016

(30) Foreign Application Priority Data

Nov. 27, 2014   (CN) .......................... 2014 1 0707249

(51) Int. Cl.
*G06F 11/00* (2006.01)
*H04L 12/26* (2006.01)
*G06F 11/30* (2006.01)
*G06F 11/07* (2006.01)
*G06F 3/06* (2006.01)
*H04L 12/24* (2006.01)

(52) U.S. Cl.
CPC ................. *H04L 43/04* (2013.01); *G06F 3/06* (2013.01); *G06F 11/0709* (2013.01); *G06F 11/0745* (2013.01); *G06F 11/3006* (2013.01); *H04L 41/00* (2013.01)

(58) Field of Classification Search
CPC .... G06F 3/06; G06F 11/0709; G06F 11/0745; G06F 11/3006; H04L 41/00; H04L 43/04
See application file for complete search history.

(56) References Cited

U.S. PATENT DOCUMENTS

2005/0228926 A1* 10/2005 Smith ................. G06F 11/0745
                                                              710/305

* cited by examiner

*Primary Examiner* — Joshua P Lottich
(74) *Attorney, Agent, or Firm* — Huffman Law Group, PC

(57) ABSTRACT

A method for handling an invalid packet for a blade server includes identifying whether a packet is valid, when the packet is identified as invalid, comparing the invalid packet with a plurality of packet data stored in a storage module, when the invalid packet is similar to a first packet datum among the plurality of packet data, executing a command indicated by the first packet datum, and ignoring the invalid packet when the invalid packet is not similar to any of the plurality of packet data.

8 Claims, 4 Drawing Sheets

METHOD FOR HANDLING INVALID PACKET

CROSS-REFERENCE TO RELATED APPLICATIONS

This non-provisional application claims priority under 35 U.S.C. §119(a) on Patent Application No. 201410707249.6 filed in China on Nov. 27, 2014, the entire contents of which are hereby incorporated by reference.

BACKGROUND OF THE INVENTION

Technical Field of the Invention

The present invention relates to a method for handling an invalid packet, particularly to a method for executing the command of the invalid packet which can be possibly lost.

Description of the Related Art

The blade server usually takes actions after receiving the packets from the chassis management controller and resolving the packets to obtain the commands. For a blade server, executing every command instructed by the packet is very important. For example, when the chassis management controller instructs the blade server to execute a shut down command, if the blade server does not exactly shut down, it influences the efficiency of other blade servers in the blade server cabinet or even the whole blade servers in the blade server cabinet.

In the current methods, when the blade server identifies a received packet as invalid, the blade server ignores the invalid packet and does not send a message to the chassis management controller for informing the invalidity of the packet, so that it may cause significant packet loss.

Owing to the packet loss problem, a method for handling an invalid packet is needed to avoid missing important commands for the blade server.

SUMMARY OF THE INVENTION

The method for handling an invalid packet for a blade server illustrated in one embodiment of the present invention includes identifying whether a packet is valid, when the packet is identified as invalid, comparing the invalid packet with a plurality of packet data stored in a storage module, when the invalid packet is similar to a first packet datum among the plurality of packet data, executing a command indicated by the first packet datum, and ignoring the invalid packet when the invalid packet is not similar to any of the plurality of packet data.

In an embodiment, the step of identifying whether a packet is valid further includes calculating a data stream of the packet and obtaining a feature value of the data stream, and comparing a verification value with the feature value. When the feature value of the packet matches the verification value, the packet is valid. When the feature value of the packet does not match the verification value, the packet is invalid.

In an embodiment, the verification value is recorded in the packet.

In an embodiment, the storage module at least stores a first packet datum for executing a reset command and a second packet datum for executing a shutdown command.

In an embodiment, the method further includes storing at least part of the packet content in the storage module as the packet datum when the packet is valid, and executing the command instructed by the valid packet.

In an embodiment, the step of comparing the invalid packet with the plurality of packet data further includes obtaining at least one extracted feature of the invalid packet and at least one verification feature of each of the plurality of packet data, comparing the extracted feature with the verification feature of each of the packet data, obtaining a similarity value of the invalid packet related to each of the packet data wherein the similarity value is a matching ratio between the extracted feature and the verification feature of each of the packet data, and determining whether the matching ratio reaches a default standard value. When the similarity value reaches the default standard value, the invalid packet is similar to the packet datum. When the similarity value does not reach the default standard value, the invalid packet is not similar to the packet datum.

The method for handling an invalid packet for a blade server illustrated in one embodiment of the present invention includes identifying whether a received packet is valid, calculating a frequency of continuously storing a lastly stored packet datum in a storage module when the packet is identified as invalid, and determining whether the frequency reaches a threshold value. When the frequency reaches the threshold value, a command instructed by the lastly store packet datum is executed. When the frequency does not reach the threshold value, the invalid packet is ignored.

In an embodiment, the method further includes storing at least part of the packet content in the storage module when the packet is identified as valid, and executing the command instructed by the packet.

The contents of the present invention set forth and the embodiments hereinafter are for demonstrating and illustrating the spirit and principles of the present invention, and for providing further explanation of the claims.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
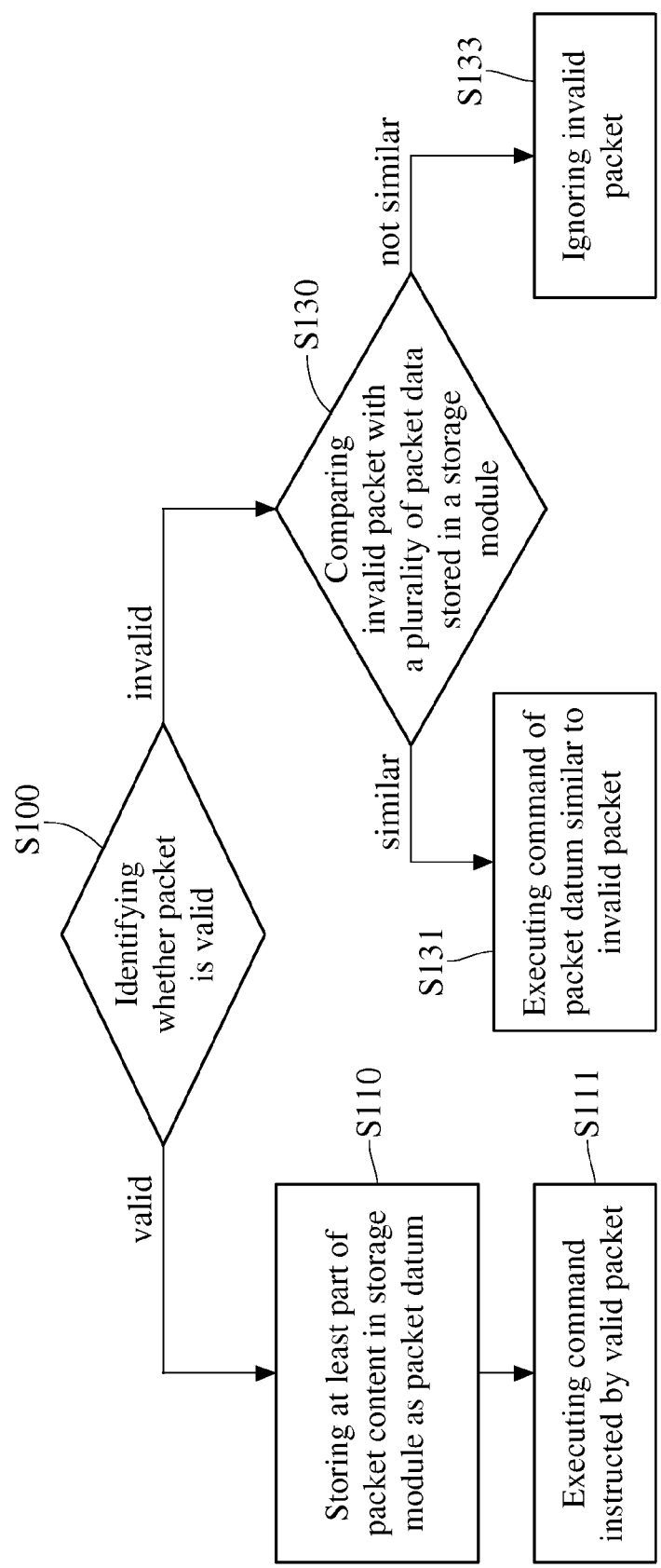
FIG. 1 is a flowchart of the method for handling an invalid packet according to an embodiment of the present invention.

FIG. 1 is a flowchart of the method for handling an invalid packet according to an embodiment of the present invention. As shown in FIG. 1, the method for handling an invalid packet is adapted for a blade server. The blade server is for receiving a plurality of packets from the control terminal and for executing the commands instructed by the received packets. The control terminal is a chassis management controller or other device capable of sending packets to the blade server.

In the step S100, when the blade server receives a packet, the blade server first identifies the validity of the received packet. The following description explains the steps after the blade server identifies the validity of the packet.

First, when the blade server identifies the packet as valid, in the step S110, the blade server directly executes the command instructed by the valid packet. In the step S111, an internal storage module is used to store the valid packet as a packet datum. The stored packet datum is all the contents of the packet or the header or payload of the packet. The number and form of the stored packet datum in the storage module is, for example, storing the lastly received 20 packet data in the storage module or only storing the same kind of packet datum in the storage module once. The aforementioned embodiment is for illustrating but not for limiting the present invention.

However, when the request of shutting down or resetting the blade server by the chassis management controller is not executed and other blade servers are affected in a great possibility. Therefore, in order to deal with the problem, the storage module in the present embodiment at least stores two kinds of packet datum. The first kind of packet datum is for executing the command of resetting the blade server, and the other kind of packet datum is for executing the command of shutting down the blade server. The aforementioned embodiment is for illustrating but not for limiting the present invention.

Next, when the blade server identifies the received packet as invalid, in the step S130, the blade server compares the invalid packet with the packet datum stored in the storage module to determine whether any of the packet data in the storage module is similar to the invalid packet.

In the step S131, when a packet datum is found to be similar to the invalid packet after the comparison, the command in the found packet datum is executed. For example, a packet datum including a shutting down command is found to be similar to the invalid command after the comparison, so the blade server is shut down.

In the step S133, when not any packet datum is found to be similar to the invalid packet, the blade server ignores the invalid packet and does not execute any command.

Figure 2:
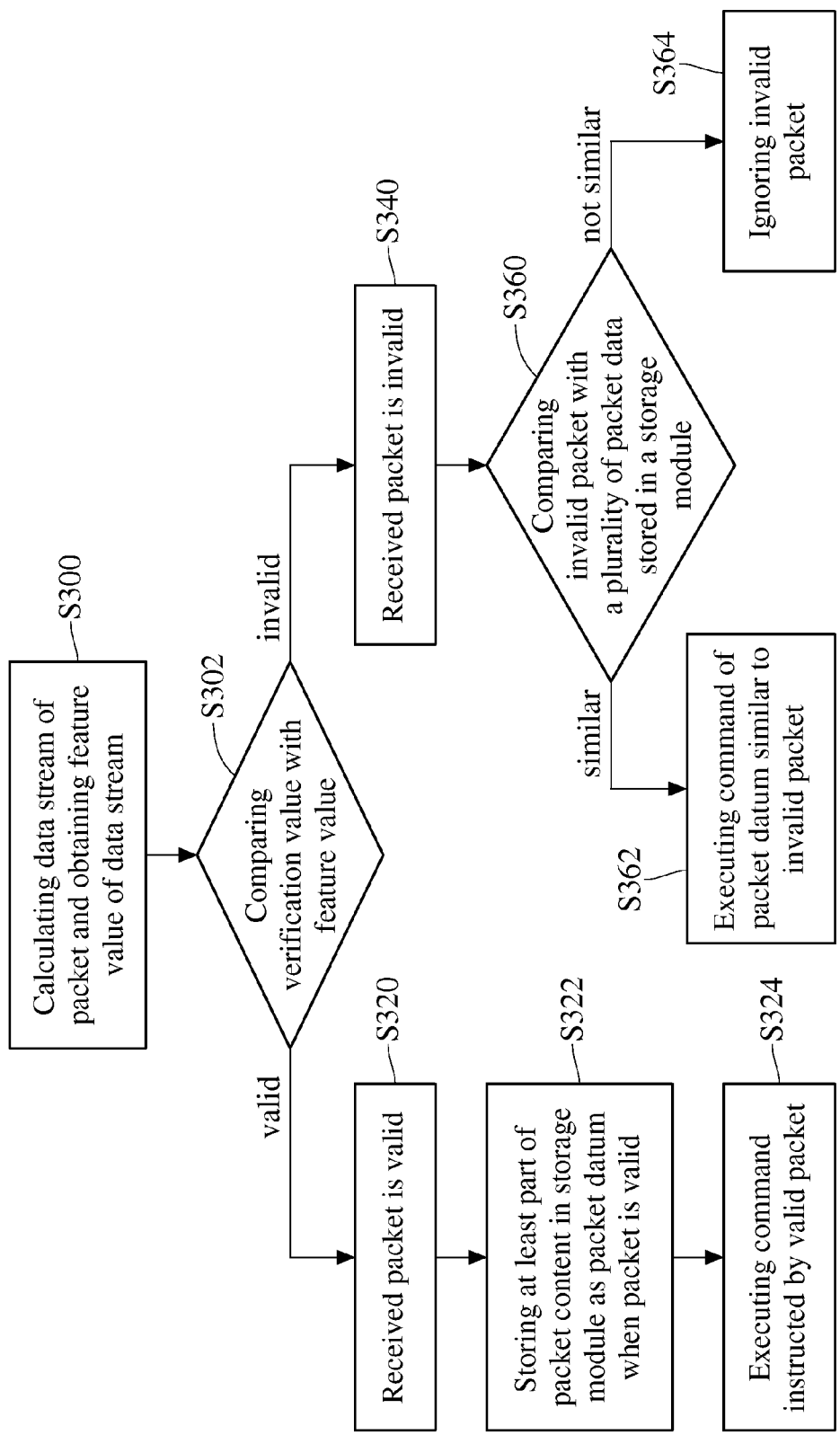
FIG. 2 is a flowchart of the method for handling an invalid packet according to another embodiment of the present invention.

Please refer to FIG. 2. FIG. 2 is a flowchart of the method for handling an invalid packet according to another embodiment of the present invention. The embodiment illustrated by FIG. 2 further explains the steps of identifying the validity of the packet. In the step S300, when the blade server receives a packet, the blade server performs a calculation on the received packet. For example, the packet sent from the control terminal further records a verification value of a packet in addition to the data stream recording the contents for execution. The blade server starts the calculation of the decoded data stream in the packet when receiving the packet to obtain a feature value corresponding to the data stream. Next, in the step S302, the blade server compares the feature value calculated from the packet data stream with the verification value recorded in the packet. In the step S320, the received packet is identified as valid when the comparison result is matched, and the following steps S322 and S324 are continued.

In the step S340, when the comparison result is not matched, the received packet is identified as invalid and the blade server executes the step S360 and compares the received packet with the packet data stored in the storage module, and executes the step S362 or S364 according to the comparison result.

Figure 3:
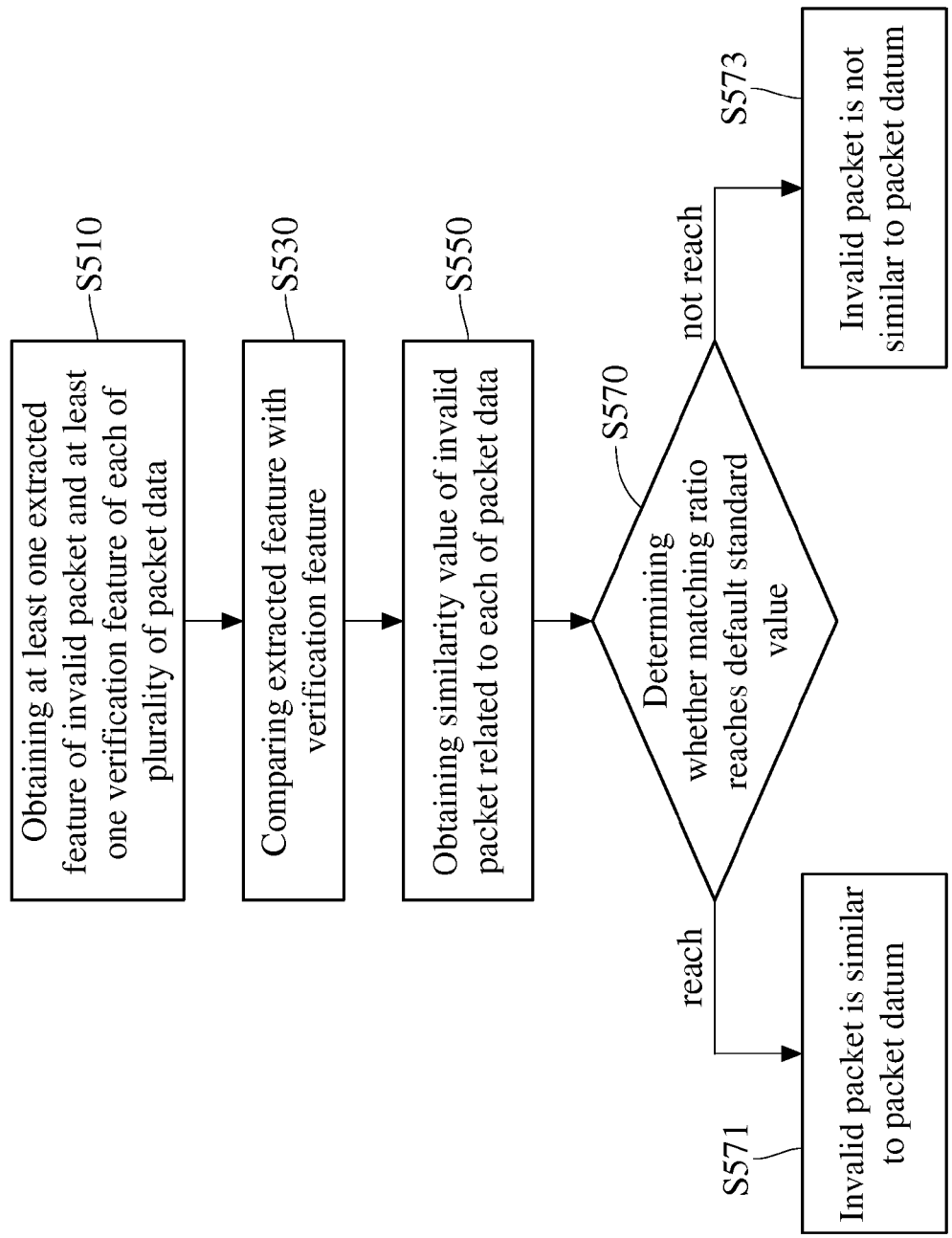
FIG. 3 is a flowchart of comparing the invalid packet with the packet datum according to another embodiment of the present invention.

Please refer to FIG. 2 with FIG. 3 together. FIG. 3 is a flowchart of comparing the invalid packet with the packet datum according to another embodiment of the present invention. FIG. 3 further explains the step S360 illustrated in FIG. 2. As shown in FIG. 3, in the step S510, the blade server first obtains at least an extracted feature from the invalid packet, such as obtaining an extracted feature from every bit of the packet, obtaining an extracted feature from every bit of the packet payload, or obtaining any other contents suitable for the extracted feature. At least one verification feature is obtained from every packet datum. For example, when the packet datum is a complete packet, a verification feature is obtained from every bit of the packet.

Next, in the step S530, the extracted feature is compared with the verification feature. In the step S550, a similarity value is obtained from the invalid packet corresponding to every packet datum. Taking selecting every bit of the invalid packet as an extracted feature and selecting every bit of the packet datum as a verification feature for example, when comparing the invalid packet with one of the packet data, every bit of the invalid packet is compared with every bit of the packet datum, and the ratio of the matched bit numbers among the whole bit numbers is a similarity value of each packet datum corresponding to the invalid packet.

In the step S570, the blade server has default standard value. When the similarity value corresponding to every packet datum reaches the default standard value, such as in the step S571, the invalid packet is similar to the packet, and then the step S362 in FIG. 2 is executed. In the step S573, when not any similarity value corresponding to the packet datum reaches the default standard value, the invalid packet is not similar to the packet and the step S364 in FIG. 2 are executed.

Figure 4:
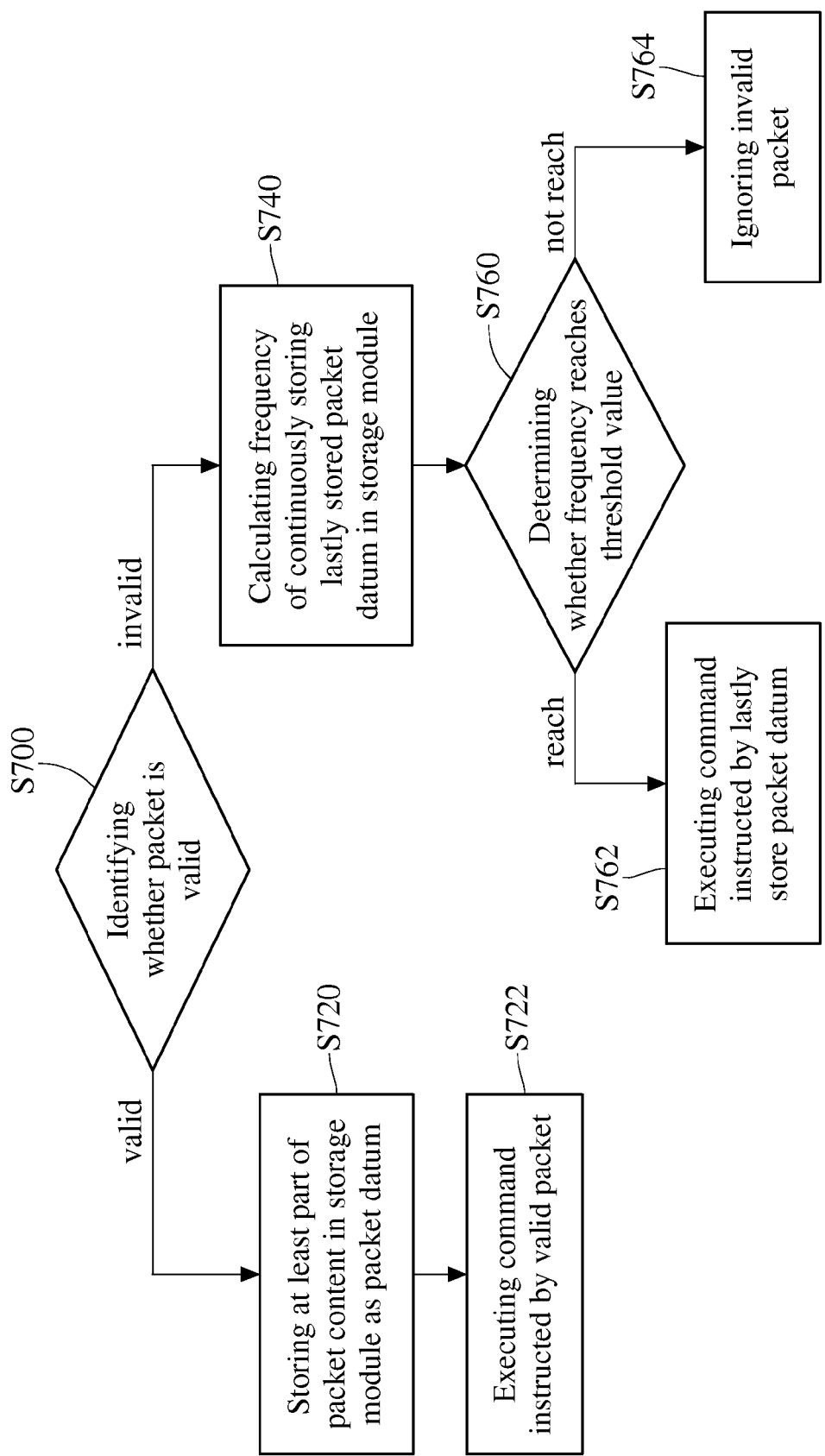
FIG. 4 is a flowchart of the method for handling an invalid packet according to a further embodiment of the present invention.

Please refer to FIG. 4. FIG. 4 is a flowchart of the method for handling an invalid packet according to a further embodiment of the present invention. As shown in FIG. 4, when the blade server receives a packet from the control terminal, in the step S700, the blade server identifies the validity of the received packet.

In the step S720, when the blade server identifies the received packet as valid, the blade server directly executes the command of the valid packet. In the step S722, the valid packet is stored in an internal storage module as the packet datum. The packet datum is all the contents of the packet or the header, payload of the packet. The packet data stored in the storage module are a plurality of valid packets lastly received by the blade server, such as the lastly received 20 packets. The number of the packet datum stored in the storage module depends on the needs of the blade server or the capacity of the storage module. The aforementioned embodiment is for illustrating but not for limiting the present invention.

When the blade server identifies the received packet as invalid, in the step S740, the blade server starts to calculate the frequency of continuously storing the lastly stored packet data in the storage module. For example, when the blade server receives a valid packet A, the blade server executes the command of the packet A and stores the packet A as a packet datum in the storage module. Next, when receiving the invalid packet B, the blade server starts to calculate the frequency of continuously storing the packet A in the storage module before storing the packet A.

Next, in the step S760, the blade server determines whether the frequency of continuously storing the packet A reaches a threshold value. For example, the storage module has stored the packet A 10 times before storing the packet A this time, so the frequency of continuously storing the packet A is 11 times and exceeds the threshold value of 10 times.

Then, in the step S762, the blade server executes the command instructed by the last stored packet datum, such as executing the command of packet A.

In the step S764, when the frequency of continuously storing the last packet datum in the storage module does not reach the threshold value, the blade server ignores the invalid packet and does not execute any command.

In summary, the method for handling an invalid packet mainly includes two major steps. One of the two major steps is using the storage module to store the packet which is valid and has the executed command, and then further compares the invalid packet with the packets in the storage module when a packet is identified as invalid. Next, the command of the similar packet is executed when the invalid packet has higher similarity to the compared packet to avoid ignoring the invalid packet and missing the important command. The other step is to determine the frequency of continuously executing a packet of a previously executed packet. When the same packet is continuously executed several times, the invalid packet possibly has the same command, so the same command is executed. By the aforementioned major steps, the blade server still executes the commands instructed by the chassis management controller even when receiving an invalid packet, so that missing the important command by the blade server is avoided.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A method for handling an invalid packet for a blade server, comprising:
    identifying whether a packet is valid;
    when the packet is identified as invalid, comparing the invalid packet with a plurality of packet data stored in a storage module;
    when the invalid packet is similar to a first packet datum among the plurality of packet data, executing a command indicated by the first packet datum; and
    ignoring the invalid packet when the invalid packet is not similar to any of the plurality of packet data.

2. The method of claim 1, wherein in the step of identifying whether a packet is valid, further comprising:
    calculating a data stream of the packet and obtaining a feature value of the data stream; and
    comparing a verification value with the feature value;
    wherein when the feature value of the packet matches the verification value, the packet is valid;
    wherein when the feature value of the packet does not match the verification value, the packet is invalid.

3. The method of claim 2, wherein the verification value is recorded in the packet.

4. The method of claim 1, wherein the storage module at least stores a first packet datum for executing a reset command and a second packet datum for executing a shutdown command.

5. The method of claim 1, further comprising:
    storing at least part of the packet content in the storage module as the packet datum when the packet is valid; and
    executing the command instructed by the valid packet.

6. The method of claim 1, wherein in the step of comparing the invalid packet with the plurality of packet data, further comprising:
    obtaining at least one extracted feature of the invalid packet and at least one verification feature of each of the plurality of packet data;
    comparing the extracted feature with the verification feature of each of the packet data;
    obtaining a similarity value of the invalid packet related to each of the packet data wherein the similarity value is a matching ratio between the extracted feature and the verification feature of each of the packet data; and
    determining whether the matching ratio reaches a default standard value;
    wherein when the similarity value reaches the default standard value, the invalid packet is similar to the packet datum;
    wherein when the similarity value does not reach the default standard value, the invalid packet is not similar to the packet datum.

7. A method for handling an invalid packet for a blade server, comprising:
    identifying whether a received packet is valid;
    calculating a frequency of continuously storing a lastly stored packet datum in a storage module when the packet is identified as invalid; and
    determining whether the frequency reaches a threshold value;
    wherein when the frequency reaches the threshold value, a command instructed by the lastly store packet datum is executed;
    wherein when the frequency does not reach the threshold value, the invalid packet is ignored.

8. The method of claim 7, further comprising:
    storing at least part of the packet content in the storage module when the packet is identified as valid; and
    executing the command instructed by the packet.

* * * * *